Nov. 1, 1938.   G. SLAYTER ET AL   2,135,057
FABRIC BELTING
Original Filed Feb. 7, 1936
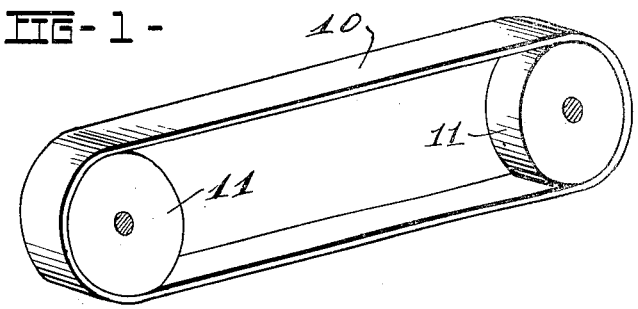
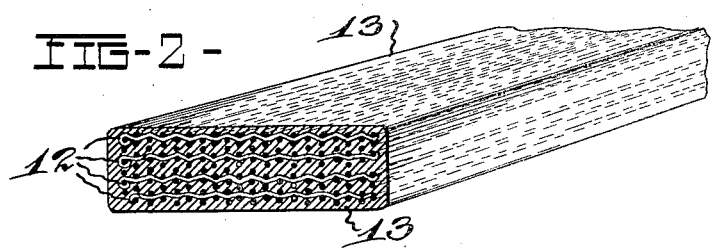
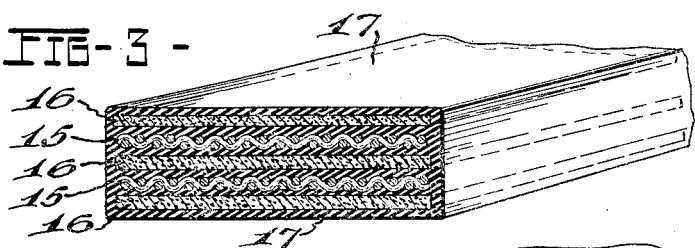
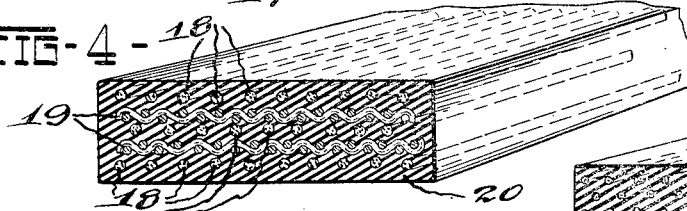
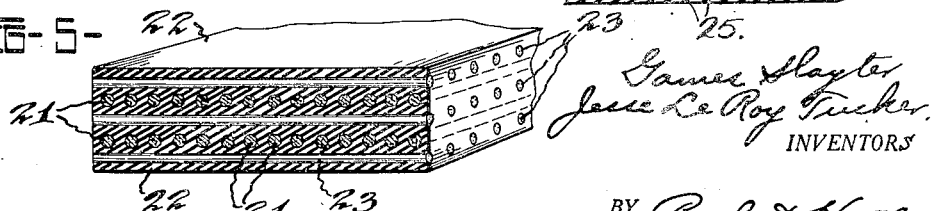
James Slayter
Jesse Le Roy Tucker
INVENTORS
BY Rule & Hope,
ATTORNEYS.

Patented Nov. 1, 1938

2,135,057

UNITED STATES PATENT OFFICE 2,135,057

FABRIC BELTING

Games Slayter and Jesse Le Roy Tucker, Newark, Ohio, assignors to Owens-Illinois Glass Company, a corporation of Ohio Application February 7, 1936, Serial No. 62,783
Renewed July 2, 1938

8 Claims. (Cl. 74—231)

The present invention relates to fabric belting and more particularly to belts comprising a flexible, vitreous fiber.

In belting for conveyors, pulleys, etc., considerable difficulty has been encountered due to stretching of the belt. Heretofore the fabrics which formed the body of the belt were made of various organic or plant fibers such as cotton, flax, etc. A disadvantage of these materials was that they stretched under tension to such degree that the belt soon lost its efficiency and had to be repaired or adjusted. Often due to atmospheric conditons, drive belts or conveyor belts of this type would stretch or shrink, depending upon the weather conditions and humidity. The prior belts had the foregoing as well as other disadvantages and shortcomings which it is an object of the present invention to minimize or overcome.

It is another object of the present invention to provide a conveyor or pulley belt in which the body of the belt is made of a strong, flexible material that will not continue to stretch materially under tension.

It is a further object of the present invention to provide a belt which is not affected by atmospheric conditions, is acid-proof and is heat-proof under ordinary working conditions.

Other objects and advantages of the present invention will become apparent from the following description taken in conjunction with the drawing in which:

Fig. 1 is a perspective view of a conventional pulley system having a belt inter-connecting and running over the pulleys.

Figs. 2 to 6 are cross-section perspective views of various embodiments and adaptations of our invention.

Broadly, the present invention contemplates the use of a flexible, vitreous fiber, preferably the long, fine fibers of glass wool, in a conveyor or pulley belt 10 running over the pulleys 11.

Glass fibers are excellently suited to our novel belt for several reasons. It is possible to form fine, attenuated glass fibers having any desired fineness. Glass fibers have the characteristics of great strength and flexibility, particularly when in the form of fine, attenuated fibers, and, in addition, these fibers may be made in continuous lengths, which in general is desirable. When glass is drawn to extreme fineness, ranging from about .00006" to a few thousandths of an inch, it acquires a tensile strength which has been measured to be for the finer fibers as high as 1,000,000 or more lbs. per square inch. Fine glass fibers also have sufficient flexibility to permit them to be bent around extremely small radii of curvature without fracture. Besides their great strength and flexibility, glass fibers have the characteristic of possessing unusually high, heat resisting properties, being non-inflammable and also resistant to acid attack. Belts made solely of glass fibers may be exposed to acid or moisture vapors without deleterious effect and glass fibers will not shrink nor stretch as organic fibers such as cotton, wool, linen, etc. will do.

By the use of a flexible glass fiber, either in the form of single fibers, strands, mat or woven fabric, as the ply or fabric in belting, it is possible to form a non-extensible belt which is heat-proof, acid-proof and fire-resistant. The glass fibers may be woven into a cloth or canvas of any desired thickness and number of ply to provide sufficient strength and friction qualities for the particular use which is desired. In view of the fact that glass wool is not affected by weather conditions, humidity, heat or the like, the belt will not stretch or shrink due to these causes.

In Figs. 2 to 5 the glass fibers have been illustrated as being embedded in a pliable material such as rubber, latex or the like, to form the belt, as one skilled in the art would readily understand. More specifically, Fig. 2 shows the glass fibers 12 woven into a conventional basket weave cloth. A plurality of layers of this glass fiber cloth, laid one on top of the other, have been impregnated with and embedded in a pliable substance 13, such as a rubber, latex or rubberoid substance. The fibers in this belt are protected from friction with the pulleys upon which it runs and also from any material which the belt may be obliged to carry. In addition, the fibers are protected from each other by the protective coating which the pliable substance provides. This protective coating reduces the internal friction and consequent wear of the belt.

Fig. 3 illustrates a belt in which a cloth fabric 15, made from a conventional material such as cotton or flax, has been incorporated in alternate layers with sections of glass wool fibers 16. These alternate layers are then embedded in a pliable coating 17 to form the finished belt. The glass fibers 16 are flexible and non-extensible and serve to increase the strength and reduce the stretching or shrinking of the belt caused by the organic fibers 15. The glass fibers may extend lengthwise of the belt in parallel relation, each fiber being embedded in the coating material 17 and thereby held out of contact with adjoining fibers, so that frictional contact and abrasion of adjoining fibers is prevented.

A similar structure has been shown in Fig. 4 in which layers of glass fibers 18 have been alternately arranged in layers with the layers of fabric 19. The latter may be fabricated from any one of a number of materials according to the particular purpose for which it is desired. The glass fibers 18 are all spaced apart or arranged in strands, groups or cords, each including a plurality or multiplicity of individual fibers. The fibers or strands are laid in parallel longitudinal arrangement so that each fiber or strand is completely embedded and surrounded by the pliable substance 20. In view of the fact that fine, long, glass wool fibers 18 are non-extensible, the finished belt, having these fibers embedded therein, will not stretch materially.

Fig. 5 depicts rows 21 of individual glass fibers embedded in the pliable material 22. Each row is composed of a series of parallel fibers arranged longitudinally of the belt itself. Interspaced between the rows 21 may be alternate rows 23 of fibrous material, arranged transversely of the belt as shown, or arranged parallel to the rows 21. In fabricating a belt of the above description, it is possible to lay down a layer of the pliable material 22 while in a molten or semi-liquid state, and then overlay this layer with a row 21 of fibers or threads, over which a second layer of pliable material is applied. Additional rows of fibers or threads may be added in accordance with particular specifications. In this manner the individual fibers or threads may be completely embedded and surrounded by the pliable material as a protective coating. When the fibers are laid out straight, there is a minimization of stress concentration and internal friction between adjacent fibers.

Other arrangements of the glass fibers are also contemplated and within the scope of the invention. As, for example, as shown in Fig. 6, the belt may comprise only a row or rows of glass fibers 25 arranged longitudinally without any transverse fibers. The number of these rows also is dependent upon the required strength and thickness of the belt.

Although the present invention has been illustrated and described in connection with specific embodiments thereof, it is to be understood that variations and modifications may be made which are within the spirit and scope of the appended claims.

We claim:
1. A power belt comprising a woven fabric including glass wool fibers, at least some of which extend longitudinally of the belt.
2. A power belt comprising a woven fabric including glass wool fibers, at least some of which extend longitudinally of the belt, and a pliable substance in which said fibers are embedded.
3. A power belt comprising a flexible rubber substance and a plurality of fine glass fibers embedded therein, at least some of which extend longitudinally of the belt.
4. A power belt comprising a flexible rubber substance and a plurality of fine glass fibers embedded therein, a portion of said fibers being laid longitudinally within said belt.
5. A power belt comprising a flexible rubber substance and a plurality of fine glass fibers embedded therein, a portion of said fibers being in parallel arrangement and extending longitudinally of the belt.
6. A power belt comprising a flexible rubber substance and a plurality of fine glass fibers embedded therein, a portion of said fibers being spaced apart from each other in parallel arrangement and extending longitudinally of said belt, another portion of said fibers being spaced apart in parallel arrangement with each other and extending transversely of said belt.
7. A flexible non-extensible power belt which comprises a base of long, attenuated, fine glass wool fibers, at least some of which extend longitudinally of the belt, and a rubber substance in which said fibers are embedded.
8. A flexible non-extensible power belt which comprises a plurality of long, attenuated, fine glass wool fibers arranged in parallel relation and extending longitudinally of said belt, a plurality of threads of organic fibers, at least a portion of said threads extending longitudinally of said belt, and a pliable substance in which said glass wool and organic fibers are embedded.

GAMES SLAYTER.
JESSE LE ROY TUCKER.